(12) United States Patent
Takei et al.

(10) Patent No.: US 6,308,534 B1
(45) Date of Patent: *Oct. 30, 2001

(54) VACUUM DEGASSING APPARATUS FOR MOLTEN GLASS

(75) Inventors: Yusuke Takei, Tokyo; Shigekuni Inoue, Kanagawa; Michito Sasaki, Kanagawa; Yasuharu Hirabara, Kanagawa; Atsushi Tanigaki, Kanagawa; Mitsuo Sugimoto, Kanagawa, all of (JP)

(73) Assignee: Asahi Glass Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/322,993

(22) Filed: Jun. 1, 1999

(30) Foreign Application Priority Data

Jun. 19, 1998 (JP) .................................................. 10-173231

(51) Int. Cl.$^7$ ...................................................... C03B 5/00
(52) U.S. Cl. .............................. 65/347; 65/346; 65/134.2; 65/134.9; 65/374.13
(58) Field of Search ............................... 65/134.2, 134.9, 65/346, 347, 374.13

(56) References Cited

U.S. PATENT DOCUMENTS

| 1,598,308 | * | 8/1926 | Pike | 65/134.2 |
|---|---|---|---|---|
| 3,519,412 | | 7/1970 | Olink . | |
| 5,316,563 | | 5/1994 | Ishimura et al. . | |
| 5,849,058 | * | 12/1998 | Takeshita et al. | 65/134.2 |
| 5,851,258 | | 12/1998 | Ando et al. . | |

FOREIGN PATENT DOCUMENTS

| 0 759 524 | 2/1997 | (EP) . |
|---|---|---|
| 0 908 417 | 4/1999 | (EP) . |
| 2-221129 | 9/1990 | (JP) . |
| 3-33020 | 2/1991 | (JP) . |
| 3-69516 | 3/1991 | (JP) . |
| 4-31325 | 2/1992 | (JP) . |
| 5-58646 | 3/1993 | (JP) . |
| 5-208830 | 8/1993 | (JP) . |
| 5-208845 | 8/1993 | (JP) . |
| 5-229831 | 9/1993 | (JP) . |
| 6-305735 | 11/1994 | (JP) . |

* cited by examiner

Primary Examiner—Michael Colaianni
(74) Attorney, Agent, or Firm—Oblon, Spivak, McClelland, Maier & Neustadt, P.C.

(57) ABSTRACT

Molten glass has a liquid level located at a higher level than lower ends of an uprising pipe and a downfalling. In addition, a contacting portion of the uprising pipe or the downfalling pipe and a brick receiver on an upstream or downstream pit for supporting the uprising or downfalling pipe, or a joint in the brick receiver is filled with sealing material.

13 Claims, 4 Drawing Sheets

VACUUM DEGASSING APPARATUS FOR MOLTEN GLASS

The present invention relates to a vacuum degassing apparatus for molten glass, which removes bubbles from molten glass continuously supplied.

In order to improve the quality of formed glass products, there has been used a vacuum degassing apparatus which removes bubbles generated in molten glass before the molten glass which has been molten in a melting vessel is formed by a forming apparatus, as shown in FIG. 4.

The vacuum degassing apparatus 410 shown in FIG. 4 is used in a process wherein molten glass G in the melting vessel 420 is vacuum-degassed and is continuously supplied to a subsequent treatment vessel. The vacuum degassing apparatus includes a vacuum housing 412 which is evacuated to be depressurized therein for vacuum-degassing, a vacuum degassing vessel 414 which is depressurized along with the vacuum housing 412, and an uprising pipe 416 and a downfalling pipe 418 which are connected to both end portions of the vacuum degassing vessel so as to extend downwardly and vertically. The uprising pipe 416 has a lower end immersed in the molten glass G in an upstream pit 422 in communication with the melting vessel 420. Likewise, the downfalling pipe 418 has a lower end immersed in the molten glass G in a downstream pit 424 in communication with the subsequent treatment vessel (not shown).

The vacuum degassing vessel 414 is provided in the vacuum housing 412 in a substantially horizontal direction, which is evacuated by a vacuum pump, not shown, to be depressurized therein. The vacuum degassing vessel 414 as well as the vacuum housing 412 is depressurized to a pressure of $1/20-1/3$ atmosphere therein. As a result, the molten glass G before vacuum-degassing in the upstream pit 422 is sucked and drawn up by the uprising pipe 416 to be introduced into the vacuum degassing vessel 414, the molten glass is vacuum-degassed in the vacuum degassing vessel 414, and the molten glass is drawn down by the downfalling pipe 418 to be discharged into the downstream pit 424.

In order to evacuate the vacuum housing 412 through a suction port 412c by the vacuum pump or the like, not shown, to depressurize the inside of the vacuum degassing vessel 414 to a certain pressure and to maintain the certain pressure therein, the vacuum degassing vessel 414 has suction ports 414a, 414b formed in an upper portion thereof so as to be open toward the inside of the vacuum housing 412.

The vacuum housing 412 is a metallic casing, such as an ordinary steel casing, a stainless steel casing or a heat-resistant steel casing. The vacuum housing is evacuated by the vacuum pump (not shown) or the like from outside to be depressurized therein, depressurizing the inside of the vacuum degassing vessel 414 provided therein to the certain reduced pressure, such as a pressure of $1/20-1/3$ atmosphere and maintaining the reduced pressure in the vacuum degassing vessel.

Around the vacuum degassing vessel 414, the uprising pipe 416 and the downfalling pipe 418 in the vacuum housing 412 is provided thermal insulation material 430, such as refractory bricks, to cover these members for thermal insulation.

Since the conventional vacuum degassing apparatus 410 is used to deal with the molten glass G at a high temperature, such as a temperature in a range of 1,200–1,400° C., paths for molten glass in direct contact with the molten glass G, such as the vacuum degassing vessel 414, the uprising pipe 416 and the downfalling pipe 418, are constituted by circular shells made of noble metal, such as platinum and platinum alloy like platinum rhodium, as disclosed in JP-A-2221129 in the name of the applicants.

The reason why the paths for molten glass, such as the vacuum degassing vessel 414, the uprising pipe 416 and the downfalling pipe 418, are constituted by a circular shell made of noble metal, such as platinum and platinum alloy, is that there is no inclusion of impurities into the molten glass G and a certain strength is ensured at high temperatures since it is hardly possible due to low reactivity of the noble metal with the molten glass at a high temperature that, when the noble metal contacts the molten glass G at such a high temperature, the noble metal does not elute by reaction with the molten glass G.

When the paths for molten glass, such as the vacuum degassing vessel 414, the uprising pipe 416 and the downfalling pipe 418, are made of noble metal, such as platinum and platinum alloy, the following problems are created especially in building the vacuum degassing apparatus 410 in a large size:

(1) It is required that the temperature of the molten glass G at an inlet of the vacuum degassing apparatus 410 be not higher than 1,400° C.

When the temperature is higher than 1,400° C., the strength of the noble metal lowers. In order to set the temperature at a temperature not higher than 1,400° C., the temperature in the melting vessel 420 can not be raised in a sufficient way. This could lead to insufficient dissolution of glass material in the melting vessel 410.

(2) The cost greatly increases.

In order to deal with a large quantity of molten glass, the paths are required to have a large sectional area. This requires that the paths have a thick wall to maintain a required strength for the paths, remarkably increasing the required quantity of the expensive noble metal and significantly raising the cost.

In terms of mainly cost reduction, a proposal has been made to constitute the paths for molten glass in the vacuum degassing vessel 414, the uprising pipe 416 and the downfalling pipe 418 in the conventional vacuum degassing apparatus 410 shown in FIG. 4 by refractory bricks more inexpensive than noble metal, such as platinum and platinum alloy, in order to build the apparatus in a large size and increase the degassing throughput of the molten glass.

However, there are limits to which refractory bricks are formed in a large size. It is absolutely impossible to build each of the vacuum degassing vessel 414, the uprising pipe 416 and the downfalling pipe 418 from a single refractory brick. In order to constitute the vacuum degassing vessel 414, the uprising pipe 416 and the downfalling pipe 418 of the vacuum degassing apparatus 410 by refractory bricks, many refractory bricks are required to be combined. This means that joints are inevitably formed between the refractory bricks in the paths in direct contact with the molten glass.

If a joint is in touch with atmosphere, there is a possibility that air enters into the paths through the joint to make it difficult to maintain the depressurized state in the paths since the inside of the paths in direct contact with the molten glass is depressurized. There is no possibility that this problem is created at the vacuum degassing vessel 414 because the vacuum degassing vessel is housed in the depressurized vacuum housing 412. However, there is left a possibility that air enters through a joint because it is difficult to house the uprising pipe 416 and the downfalling pipe 418 in their entirety in the vacuum housing.

It is an object of the present invention to solve the problems of the conventional apparatus and to provide a large size of practical vacuum degassing apparatus capable of dealing with a large quantity of molten glass.

In order to attain the object, the present invention provides a vacuum degassing apparatus for molten glass, comprising a vacuum housing which is evacuated to be depressurized therein; a vacuum degassing vessel made of refractory material, which is provided in the vacuum housing to vacuum-degas molten glass; an uprising pipe made of refractory material, which connects to the vacuum degassing vessel in the vacuum housing, and sucks and draws up undegassed molten glass to introduce the undegassed molten glass into the vacuum degassing vessel; a downfalling pipe made of refractory material, which connects to the vacuum degassing vessel in the vacuum housing and draws down the degassed molten glass from the vacuum degassing vessel to discharge the degassed molten glass; an upstream pit which supports the vacuum housing and the uprising pipe and connects to the uprising pipe; and a downstream pit which supports the vacuum housing and the downfalling pipe and connects to the downfalling pipe; wherein the uprising pipe and the downfalling pipe have lower edges positioned at a lower level than a liquid level of the undegassed molten glass when depressurization starts.

It is preferable that there is provided a brick receiver between the uprising pipe and the upstream pit, and/or a brick receiver between the downfalling pipe and the downstream pit.

It is preferable that the brick receiver comprises a plurality of refractory bricks combined so as to have polished surfaces located in surface contact with each other, the polished surfaces having a smoothness of not greater than 0.3 mm, and seal glass is filled into a joint between adjoining refractory bricks. It is preferable that the brick receiver has a metallic retainer provided therearound.

It is preferable that the vacuum housing has a lower end portion extended downwardly along the uprising pipe (the downfalling pipe), the lower end portion has a lower end located at the same level as the lower end of the uprising pipe (the downfalling pipe) in a vertical direction, the brick receiver is interposed between the lower end portion and the uprising pipe (the downfalling pipe), and the upstream pit (the downstream pit), and the brick receiver has sealing material filled in a portion thereof in contact with the lower end portion. It is more preferable that the lower end portion has a water pipe provided therearound.

It is preferable that at least one of the uprising pipe and the downfalling pipe has a lower end portion extended from the vacuum housing, and at least one portion around an outer periphery of the lower end portion of the at least one of the uprising pipe and the downfalling pipe is covered by sealing material. It is more preferable that a water pipe is provided to contact with the sealing material.

It is preferable that the lower end portion of the at least one of the uprising pipe and the downfalling pipe is clamped by a band-shaped metallic fixture on an outer surface of the sealing material. It is particularly preferable that the water pipe is provided between the sealing material and the band-shaped metallic fixture.

It is preferable that at least one of a contacting portion of the lower end portion of the uprising pipe and a brick receiver interposed between the uprising pipe and the upstream pit, and a contacting portion of the lower end portion of the downfalling pipe and a brick receiver interposed between the downfalling pipe and the downstream pit has sealing material filled therein.

Now, the vacuum degassing apparatus for molten glass according to the present invention will be described in detail, referring to appropriate embodiments shown in the accompanying drawings.

Figure 1:
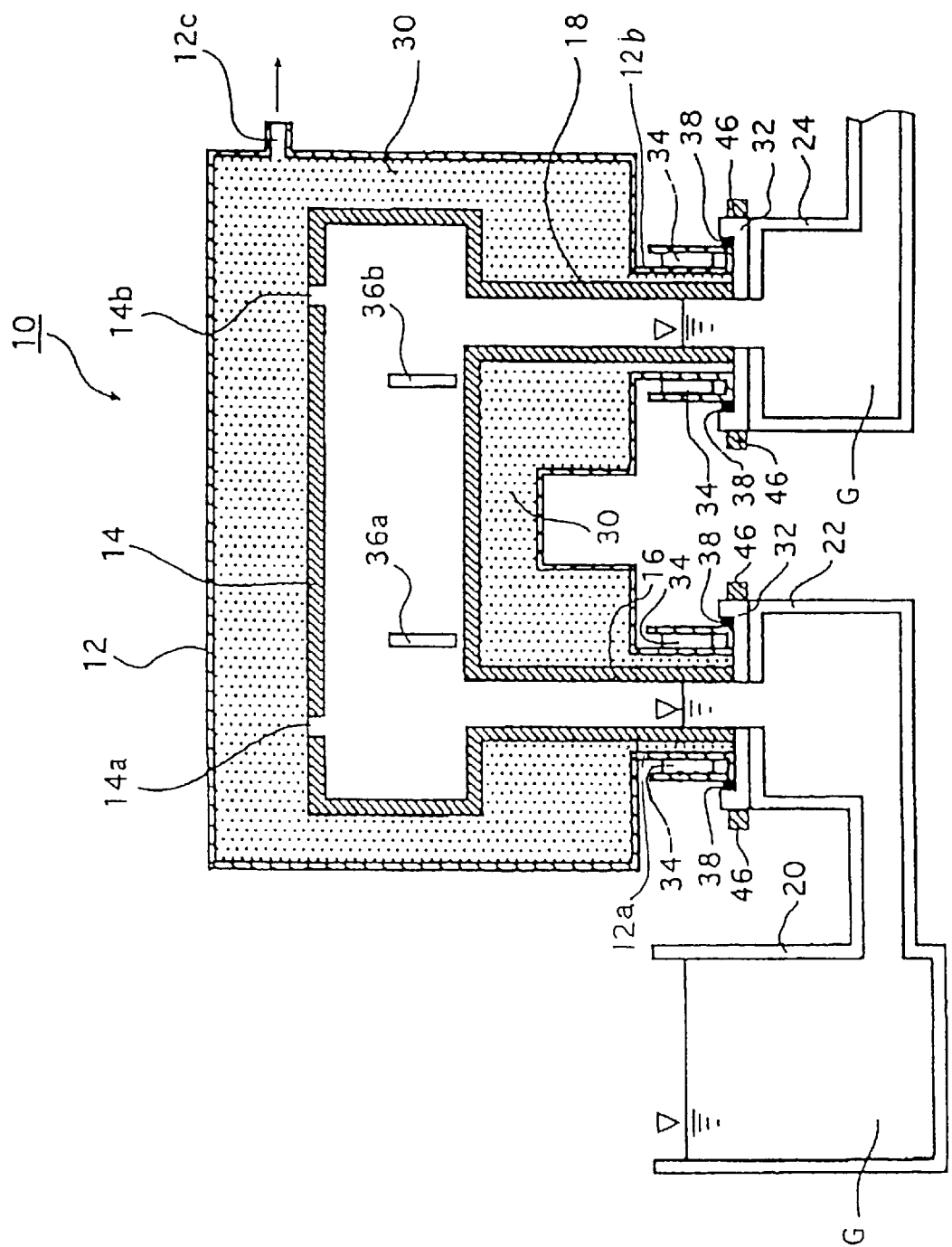
FIG. 1 is a cross-sectional view of the vacuum degassing apparatus for molten glass according to an embodiment of the present invention.

In FIG. 1 is shown a schematic cross-sectional view of the vacuum degassing apparatus for molten glass according to an embodiment of the present invention.

This schematic view shows in what state the vacuum degassing apparatus is just before drawing up molten glass G through an uprising pipe and a downfalling pipe though a vacuum housing 12 has been evacuated to be depressurized therein. The vacuum degassing apparatus 10 comprises the vacuum housing 12 in a rectangular arched shape, a vacuum degassing vessel 14 horizontally provided in the vacuum housing 12, the uprising pipe 16 and the downfalling pipe 18 which are vertically provided in the vacuum housing 12 and have upper ends connected to right and left end portions of the vacuum degassing vessel 14, an upstream pit 22 for supporting the vacuum housing 12 and the uprising pipe 16, a downstream pit 24 for supporting the vacuum housing 12 and the downfalling pipe 18, a brick receiver 32 interposed between the uprising pipe 16 and the upstream pit 22, and a brick receiver 32 interposed between the downfalling pipe 18 and the downstream pit 24.

The vacuum degassing apparatus 10 is used in a process wherein the molten glass G in a melting vessel 20 is vacuum-degassed and is continuously supplied to a subsequent treating vessel, not shown, for example, a forming treatment vessel for plate glass, such as a float bath, and a working zone of the furnace of container glasses.

The vacuum housing 12 works as a pressure vessel to ensure airtightness when depressurizing the vacuum degassing vessel 14. In this embodiment, the vacuum housing 12 is formed in a substantially rectangular arched shape so as to surround the vacuum degassing vessel 14, the uprising pipe 16 and the downfalling pipe 18. The vacuum housing 12 includes thermal insulation material 30, which is provided at a region in the vacuum housing and outside the vacuum degassing vessel 14, the uprising pipe 16 and the downfalling pipe 18, and which insulates a high temperature from the molten glass G, and the brick to use has an air-permeable property or the adjacent bricks have a clearance sufficient to provide no bar to evacuation in the vacuum degassing vessel 14. There are no limitation on the material and the structure of the vacuum housing 12 as long as the vacuum housing has an airtightness and a strength enough to depressurize the vacuum degassing vessel 14. It is preferable that the vacuum housing is made of steel, in particular stainless steel or heat-resisting steel. It is preferable that the thermal insulation material 30 comprises refractory bricks and mortar.

A vacuum pump, not shown, is used to evacuate the vacuum housing 12 through a suction port 12c provided at an upper right portion of the vacuum housing so as to be depressurized therein. Thus, the inside of the vacuum degassing vessel 14 provided in a substantially central portion of the vacuum housing 12 is depressurized to a certain pressure, such as a pressure of $1/20$–$1/3$ atmosphere and is maintained at that certain pressure.

The vacuum degassing vessel 14 is provided at the central portion of the vacuum housing 12 in a substantially horizontal direction. Although the sectional shape of the vacuum degassing vessel 14 may be circular, the sectional shape is preferably rectangular in terms of vacuum-degassing treatment of the molten glass G in a large quantity. The rectangular sectional shape is advantageous in terms of production of electro-cast bricks or dense burned refractory bricks forming the vacuum degassing vessel 14 as well. With regard to a ceiling portion of the vacuum degassing vessel 14, an arched structure is preferably adopted when the vacuum degassing vessel 14 has a great width.

In order to maintain the inside of the vacuum degassing vessel 14 at the certain pressure (a pressure of $1/20$–$1/3$ atmosphere) by evacuating the vacuum degassing vessel through the suction port 12c by, e.g., the vacuum pump, not shown, the vacuum degassing vessel 14 has an upper portion formed with suction ports 14a, 14b open toward the inside of the vacuum housing 12. The vacuum degassing vessel 14 has a barrier 36a and a barrier 36b provided therein so as to block and break bubbles rising in the molten glass G.

The uprising pipe 16 and the downfalling pipe 18 have the upper ends connected to the left end portion and the right end portion of the vacuum degassing vessel 14 so as to extend in a vertical and downward direction, respectively. The uprising pipe 16 and the downfalling pipe 18 have lower ends provided so as to be flush with lower surfaces of legs of the vacuum housing 12 in the rectangular arched shape, or lower end portions 12a, 12b of the vacuum housing downwardly extending along the uprising pipe 16 and the downfalling pipe 18, respectively. The uprising pipe 16 and the downfalling pipe 18 are supported by the upstream pit 22 and the downstream pit 24 with the molten glass G filled therein through the brick receivers 32, respectively.

The loads of the vacuum degassing vessel 14, the uprising pipe 16 and the downfalling pipe 18 may be supported by only the upstream pit 22 and the downstream pit 24, or a portion or a large portion of the loads may be supported by the vacuum housing 12. In the former case, it is not required that the vacuum degassing vessel 14, the uprising pipe 16 and the downfalling pipe 18 be supported by the vacuum housing 12 all the time. When the vacuum degassing vessel 14, the uprising pipe 16 and the downfalling pipe 18 is suspended by the vacuum housing 12, the vacuum housing 12 per se is also suspended.

In the present invention, it is preferable that portions of the vacuum degassing vessel 14, the uprising pipe 16 and the downfalling pipe 18 in direct contact with the molten glass G comprise dense refractory bricks, such as electro-cast bricks and dense burned refractory bricks.

Any electro-cast bricks may be applied as long as they are dense ones enough to maintain the depressurized states of the uprising pipe, the vacuum degassing vessel and the downfalling pipe. It is preferable to use electro-cast bricks that have a high bulk density and that has an extremely small value or almost 0 of porosity on cast surfaces thereof though including closed pores therein. Examples of such electro-cast bricks are zirconia based electro-cast bricks, alumina based electro-cast bricks, alumina-zirconia-silica (AZS: $Al_2O_3$—$ZrO_2$—$SiO_2$) based electro-cast bricks.

On the other hand, as the dense burned bricks, any highly corrosion resistant burned bricks may be used. For example, dense zirconia-silica based burned bricks, such as dense zircon having a dense structure, dense alumina based burned bricks, such as dense alumina, and dense aluminum-zirconia-silica based burned bricks are listed.

The dense refractory bricks are furnace material that can maintain a depressurized state due to impermeability to air. The dense refractory bricks can be also used as the brick receivers 32.

There are no limitations on the shapes of the uprising pipe 16 and the downfalling pipe 18 as long as the shapes are tubular. The uprising pipe and the downfalling pipe may have a circular sectional shape, an elliptical sectional shape, a square sectional shape, another rectangular sectional shape, or another polygonal sectional shape.

The upstream pit 22 communicates with the melting vessel 20 through a conduit, and accumulates the molten glass G to be sucked through the uprising pipe 16. The downstream pit 24 communicates with the subsequent treatment vessel, and accumulates the molten glass G discharged from the downfalling pipe 18 after vacuum-degassing treatment.

In order that the molten glass G is introduced into the vacuum degassing vessel 14 by evacuating the vacuum degassing apparatus 10 to depressurize the inside thereof, it is required that the molten glass G be accumulated in not only the upstream pit 22 but also the downstream pit 24. This means that a bypath (not shown) is preferably provided to flow the molten glass G from the upstream pit 22 to the downstream pit 24.

The brick receivers 32 are interposed between the uprising pipe 16, the downfalling pipe 18 and the lower end portions 12a, 12b of the vacuum housing, and the upstream pit 22 and the downstream pit 24. The brick receivers are in tough with the lower end portions 12a, 12b of the vacuum housing.

Figure 2A:
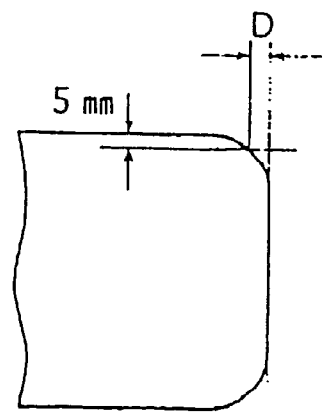
FIG. 2(A) is a schematic view showing a smoothness D of a divided brick.
Figure 2B:
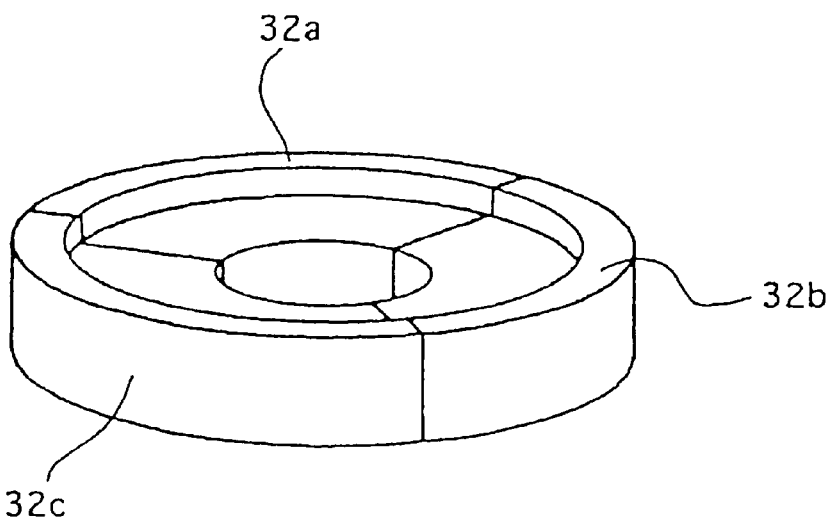
FIG. 2(B) is a perspective view schematically showing a brick receiver.

The brick receivers 32 are too large to be formed in a one-piece construction since the inner diameter of the brick receivers is around 500–1,500 mm when the degassing throughput of the molten glass is hundreds of tons a day, for instance. In accordance with the present invention, three divided bricks 32a, 32b and 32c are combined to provide each of the brick receivers as shown in FIG. 2(B) in order to cope with this problem. The brick receiver 32 shown in FIG. 2(B) has a disk-like shape with a circular hole formed at a central portion thereof, and the hole forms a path for the molten glass. There are no limitations on the shape of each of the brick receivers. Each of the brick receivers may have a rectangular hole formed so as to be matched with the sectional shape of a path for molten glass.

Each of the brick receivers 32 inevitably includes mutual contacting portions or joints between the divided bricks 32a, 32b and 32c. If there is a gap at a joint, there is a possibility that air enters through the gap to fail to maintain the inside of the vacuum housing 12 in the depressurized state. Or there is a possibility that the molten glass G erodes a joint to form a gap at the joint, causing the molten glass G to leak therethrough.

In order to avoid the occurrence of this problems, the mutual contacting surfaces between the divided bricks 32a, 32b and 32c are surfaces that are polished so as to have a smoothness D of not greater than 0.3 mm. The smoothness D is determined by a difference between the maximum value and the minimum value with respect to the height of a polished surface except for regions in a range of 5 mm from both end surfaces. Fine polish to provide a smoothness D of not greater than 0.3 mm can be carried out by the use of a diamond polisher commonly used. As shown in FIG. 2(A), a surface to be polished is generally apt to have a convex shape since ends of the surface are ground. In this case, the smoothness D expresses the magnitude of curved edges of a surface to be polished. The reason why portions of a surface to be polished in the range of 5 mm from both end surfaces is not considered in determining the smoothness is that the area of the portions in the range of 5 mm from both end surfaces is significantly small in comparison with the entire area of the contacting surfaces of the divided bricks, and that a required depressurized state can be maintained and the molten glass G is prevented from leaking even if the portions in the range of 5 mm from both end surfaces are not taken into account.

In order to prevent a gap from being provided at the joints, a metallic retainer 46 is provided around an outer peripheral surface of the divided bricks 32a, 32b and 32c of each of the brick receivers to apply a strength to the divided bricks from outside.

Figure 2C:
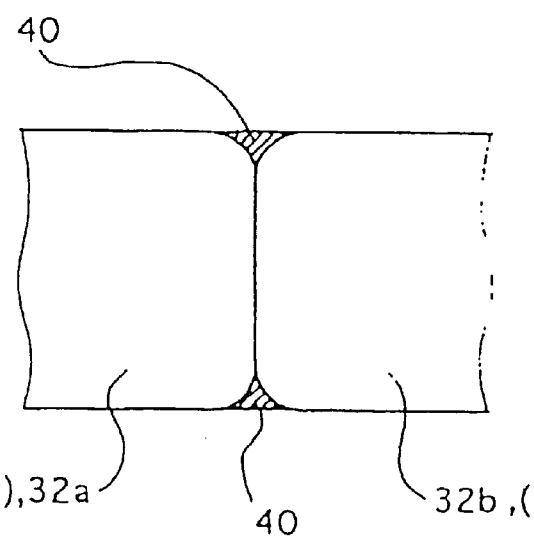
FIG. 2(C) is a cross-sectional view showing a joint of the brick receiver.

In consideration of a case wherein a gap is formed at a joint in spite of the provision of a metallic retainer 46, seal glass 40 is filled into the mutual joints between the divided bricks 32a, 32b and 32c. The seal glass 40 is filled in the following way. Since the dense refractory bricks forming the brick receivers 32 are heated by the molten glass G at a high temperature, highly viscous vitreous substance exudes from the dense refractory bricks, and the vitreous substance fills the joints, working as the seal glass 40, as shown in FIG. 2(C). Thus, the molten glass G can be prevented from eroding the joints and leaking therethrough.

If the smoothness D is greater than 0.3 mm, there is a possibility that even highly the viscous vitreous substance which has exuded from the dense refractory bricks can flow out of the gaps at the joints.

Although each of the brick receivers 32 is provided by combining the three divided bricks 32a, 32b, 32c in this embodiment, each of the brick receiver may be provided by combining two, four or a different number of divided bricks.

The lower end portions 12a, 12b of the vacuum housing 12 have water pipes 34 provided therearound, and the lower end portions have sealing material 38 filled therein to prevent air from entering or the molten glass from leaking through the contacting portions thereof with the brick receivers 32. There is no limitations on the sealing material 38, any mortar or any castable material is applicable as long as it has a heat-resisting property and an air-impermeable property. For example, AIRSET MORTAR, TIGHT SEAL and ASAHI HIBOND (all manufactured by Asahi Glass Company Ltd.) are listed.

The water pipes 34 prevent the metallic material of the lower end portions 12a, 12b from having a strength degraded by an excessive rise in the temperature of the lower end portions 12a, 12b.

In FIG. 1 is also shown the liquid level of the molten glass G when depressurization starts in the vacuum degassing apparatus 10.

The vacuum degassing apparatus 10 is configured so that the lower end of the uprising pipe 16 and the lower end of the downfalling pipe 18 are lower than the liquid level of the molten glass G when depressurization starts in the vacuum degassing apparatus 10, which is the most important feature of the present invention. The reason is as follows:

If air enters a path for molten glass through a slight gap at a joint of the bricks which are not covered by the vacuum housing 12, the required depressurizing condition can not be maintained in a sufficient way. From this viewpoint, the lower ends of the uprising pipe 16 and the downfalling pipe 18 are located so as to be nearly equal to, or preferably lower than the liquid level of a free surface of the molten glass G in the vacuum degassing apparatus 10.

By this arrangement, even if a slight gap is formed at a joint provided by bricks positioned below the liquid surface of the molten glass G and outside the vacuum housing 12, such as the divided bricks 32a, 32b, 32c forming each of the brick receivers 32, there is no possibility that air enters the uprising pipe 16 or the downfalling pipe 18 from outside. The pressure of the molten glass G below the liquid surface is greater than, atmospheric pressure, and the pressure in the slight gap at the joint is greater than atmospheric pressure. Even if the level of the joint is slightly higher than the glass level of the melter, the surface tension of the melt prevents the invade of air into the melt. As a result, external air having atmospheric pressure can not flows in the gap at the joint having a greater pressure than atmospheric pressure.

The operation of the vacuum degassing apparatus for molten glass according to the present invention, which is basically configured as stated earlier, will be explained.

First, before starting the operation of the vacuum degassing apparatus 10, the molten glass G in the melting vessel 20 is introduced into the downstream pit 24 from the uprising pit 22 by opening the bypath, not shown. The molten glass G is filled until the liquid level of the molten glass G reaches a higher level than the lower ends of the uprising pipe 16 and the downfalling pipe 18.

With the liquid level of the molten glass G reaching the higher level than the lower ends of the uprising pipe 16 and the downfalling pipe 18, the vacuum pump, not shown, is operated to evacuate the vacuum housing 12 through the suction port 12c and the vacuum degassing vessel 14 through the suction ports 14a and 14b, depressurizing the inside of the vacuum degassing vessel 14 to a pressure of ½₀–⅓ atmosphere.

As a result, the molten glass G is drawn up in the uprising pipe 16 and the downfalling pipe 18 and introduced into the vacuum degassing vessel 14 so that the difference between the liquid level of the molten glass G in the melting vessel 20 and that of the vacuum degassing vessel 14 achieves a certain value. In the vacuum degassing vessel 14 is formed an upper evacuated space above the molten glass G having a certain depth. Then, the bypass is closed.

After that, the molten glass G passes through the upstream pit 22 from the melting vessel 20, is drawn up in the uprising pipe 16 and is introduced into the vacuum degassing vessel 14. The molten glass G is vacuum-degassed under the certain depressurized condition while flowing in the vacuum degassing vessel 14. Specifically, in the vacuum degassing vessel 14 under the certain depressurizing condition, the bubbles in the molten glass G are rising in the molten glass G, rise into the upper space and are broken there or are blocked by the barriers 36a and 36b and are broken there. Thus, the bubbles are removed from the molten glass G.

The molten glass G thus degassed is discharged from the vacuum degassing vessel 14 into the downfalling pipe 18, is drawn down in the downfalling pipe 18, is introduced into the downstream pit 24, and is discharged from the downstream pit 24 into a subsequent treatment vessel, not shown (for example, a forming treatment vessel).

The vacuum degassing apparatus 10 shown in FIG. 1 is basically configured as stated above.

Now, the vacuum degassing apparatus for molten glass according to another embodiment of the present invention will be described.

Figure 3:
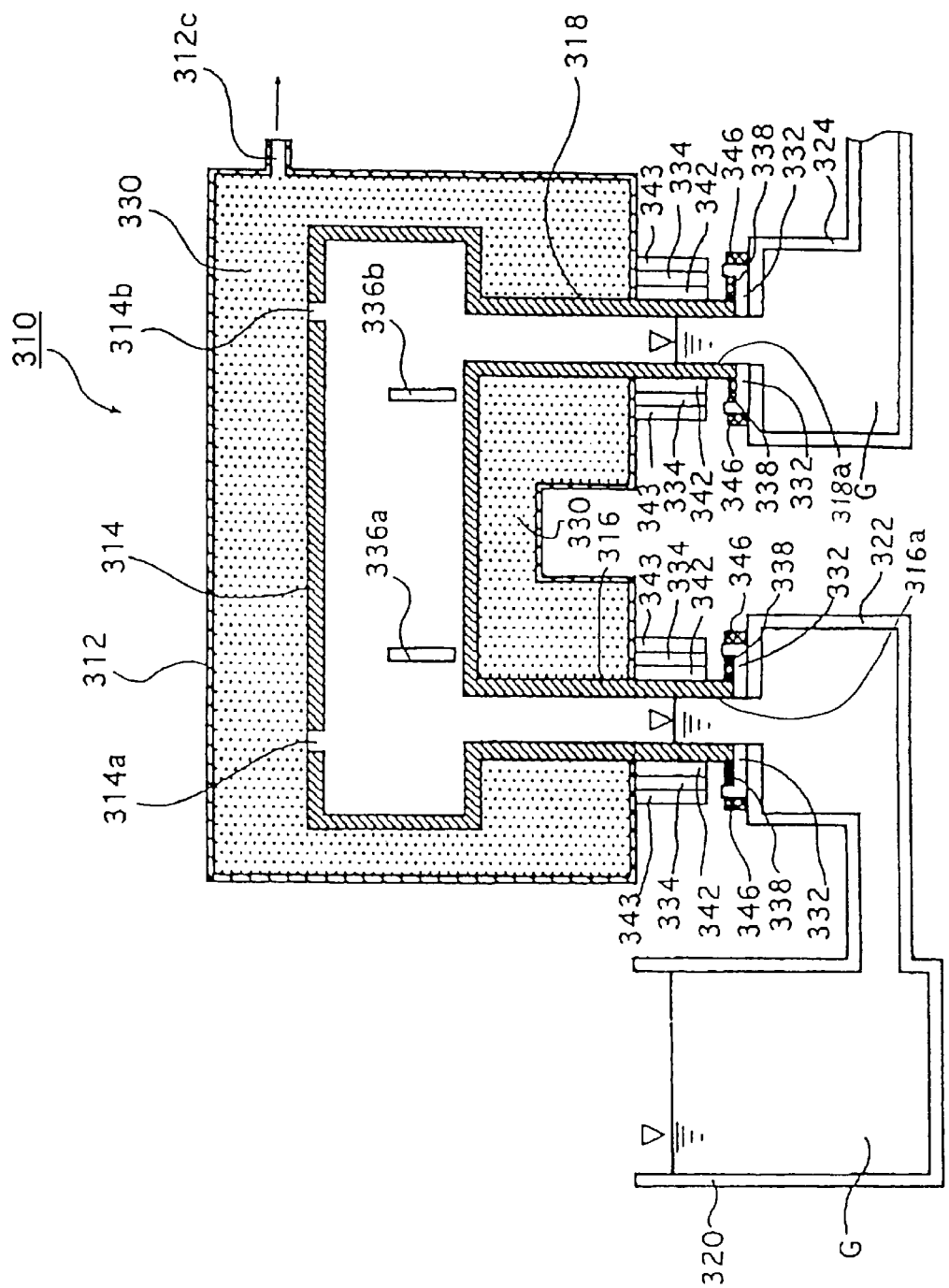
FIG. 3 is a schematic cross-sectional view of the vacuum degassing apparatus for molten glass according to another embodiment of the present invention.
Figure 4:
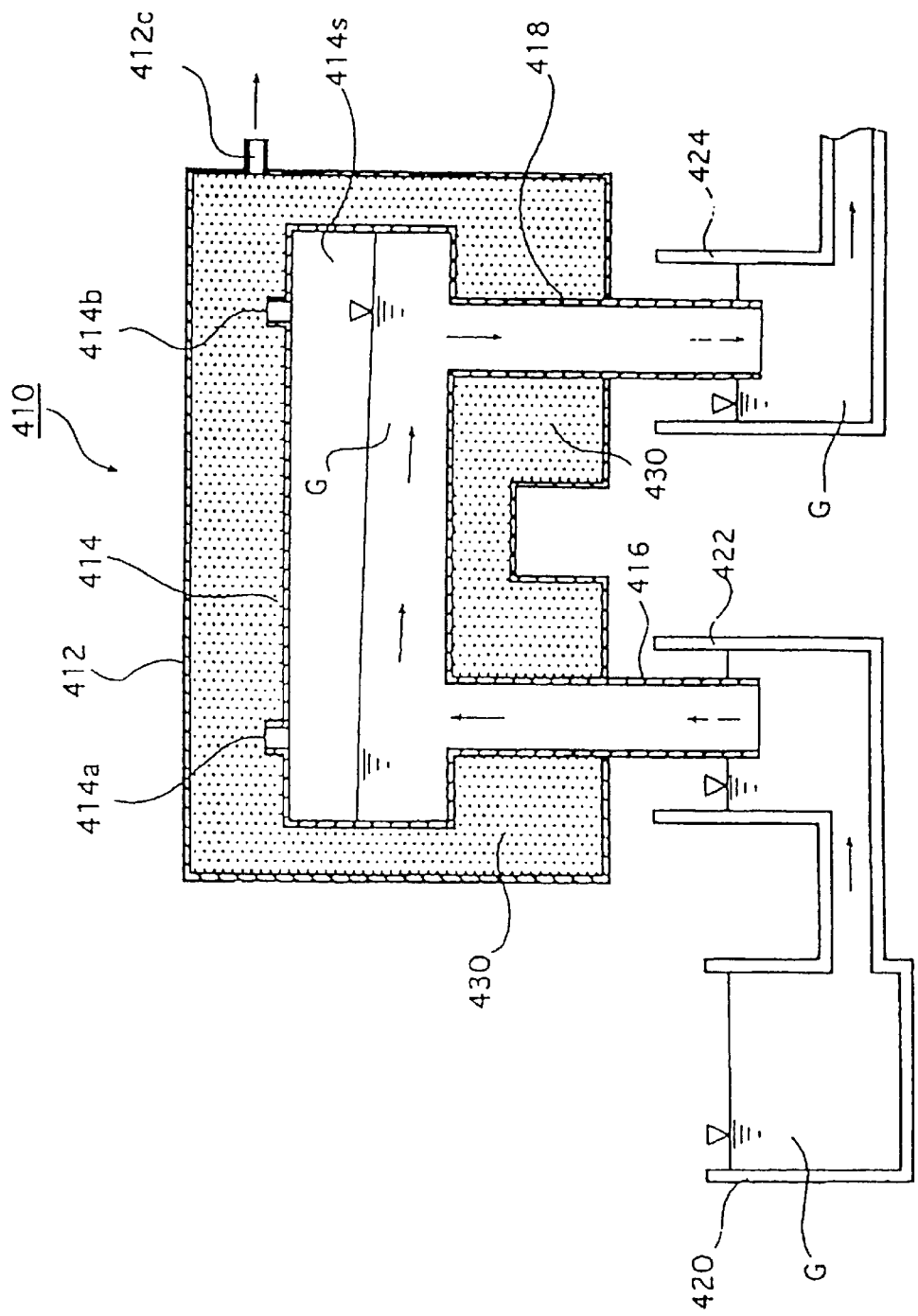
FIG. 4 is a schematic cross-sectional view of a conventional vacuum degassing apparatus for molten glass.

In FIG. 3 is shown a schematic cross-sectional view of the vacuum degassing apparatus according to the different embodiment.

FIG. 3 shows in what state the vacuum degassing apparatus 310 is just before the molten glass G is drawn up in the uprising pipe and the downfalling pipe by a evacuating operation. The vacuum degassing apparatus 310 comprises a vacuum housing 312 in a substantially rectangular arched shape, a vacuum degassing vessel 314 horizontally provided in the vacuum housing 312, an uprising pipe 316 and a downfalling pipe 318 which are provided in the vacuum housing 312 in a vertical direction and which have respective upper ends connected to right and left end portions of the vacuum degassing vessel 314, an upstream pit 322 for supporting the vacuum housing 312 and the uprising pipe 316, a downstream pit 324 for supporting the vacuum housing 312 and the downfalling pipe 318, a brick receiver 332 interposed between the uprising pipe 316 and the upstream pit 322, and a brick receiver 332 interposed between the downfalling pipe 318 and the downstream pit 314.

The inside of the vacuum housing 312 is depressurized by evacuating the vacuum housing through a suction port 312c formed at an upper right portion of the vacuum degassing vessel 314 by the use of a vacuum pump, not shown. The inside of the vacuum degassing vessel 314 is depressurized to a certain pressure (a pressure of $1/20$–$1/3$ atmosphere) and is maintained at that pressure.

The inside of the vacuum degassing vessel 314 is maintained at the certain pressure (a pressure of $1/20$–$1/3$ atmosphere) by evacuating the vacuum degassing vessel through suction ports 314a, 314b formed at an upper portion of the vacuum degassing vessel and open toward the inside of the vacuum housing 312. The vacuum degassing vessel 314 includes barrier 336a and a barrier 336b to block the bubbles rising in the molten glass G and break the bubbles there. In the vacuum housing 312 and outside a series of paths of the vacuum degassing vessel 314, the uprising pipe 316 and the downfalling pipe 318 is provided thermal insulation material 330 to thermally insulate a high temperature from the molten glass G.

Since the vacuum degassing apparatus 310 has the same structure as the vacuum degassing apparatus 10 for molten glass shown in FIG. 1 except for a lower end portion 316a of the uprising pipe 316 and a lower end portion 318a of the downfalling pipe 318, only explanation of the lower end portion 316a of the uprising pipe 316 and the lower end portion 318a of the downfalling pipe 318, which have a different structure from those of the apparatus shown in FIG. 1, will be made and explanation of other members will be omitted.

The lower end portion 316a of the uprising pipe and the lower end portion 318a of the downfalling pipe in the vacuum degassing apparatus 310 project outside from the vacuum housing 312, and joints of refractory bricks forming the projecting lower end portion 316a and the projecting lower end portion 318a are covered by sealing material 342. The covering is carried out by wrapping ceramic wool, using thermal insulation coating cement. Outside the sealing material 342 are provided water pipes 334. As the water pipes 334, these water boxes are divided into several portions in a circumferential direction, may be used for instance. Band-like metallic fixtures 343 are wound around outer surfaces of the water pipes to clamp the water pipes, if necessary. By this arrangement, even if a slight gap is formed at a joint of the bricks forming the paths provided outside the vacuum housing 312, the gap is air-sealed.

The reason why ceramic is used is that it is necessary to withstand a high temperature from the molten glass G. Although cement having a superior heat-resisting property, such as alumina cement, is used as the thermal insulation coating cement in this embodiment, there is no limitations on the thermal insulation coating cement as long as it has a heat-resisting property.

The reason why the water pipes 334 are provided is that lower surfaces of the vacuum housing 314 is prevented from being deteriorated or damaged by a high temperature from the molten glass G.

The reason why the sealing material 342 and the water pipes 334 are clamped by the band-like fixtures 343 from outside is to fix the sealing material 342 comprising ceramic wool and thermal insulation cement.

The vacuum degassing apparatus 310 is also configured so that the uprising pipe 316 and the downfalling pipe 318 have respective lower edge located at a lower level than the liquid level of the molten glass G when depressurization starts as in the vacuum degassing apparatus 10. By this arrangement, air can not flow into the uprising pipe 316 or the downfalling pipe 318 through a gap at a joint of the bricks not covered by the vacuum housing 312 or through a slight gap at a joint of the bricks forming a brick receiver 332 when depressurization starts.

Metallic retainers 346 are ones similar to the metallic retainers 46 of the vacuum degassing apparatus 10 shown in FIG. 1. Sealing material 338 is one similar to the sealing material 38 in the vacuum degassing apparatus 10 shown in FIG. 1.

The vacuum degassing apparatus 310 is basically configured as stated above.

Although the vacuum degassing apparatus for molten glass according to the present invention has been described in reference to the embodiments, the present invention is not limited to the embodiments. It is apparent that modifications and a change in design can be made within the scope of the invention. For example, an inner surface of a path for molten glass, which comprises bricks, may be lined with noble metal, such as platinum and platinum alloy.

As explained in detail, in accordance with the present invention, the lower edge of the uprising pipe or the downfalling pipe is located to be lower than the liquid level of the molten glass when depressurization starts, or the certain sealing material or seal glass is filled as air seal at a portion of joints of bricks forming the paths and not covered by the vacuum housing, at a joint of a brick receiver or at the contacting portion between the lower end portion of the vacuum housing and a brick receiver. As a result, the depressurizing state in the vacuum housing can be maintained, the molten glass can be prevented from leaking, and the operation of the vacuum degassing apparatus can be easily started.

What is claimed is:

1. A vacuum degassing apparatus for molten glass, comprising:

a vacuum housing which is evacuated to be depressurized therein;

a vacuum degassing vessel made of refractory material, which is provided in the vacuum housing to vacuum-degas molten glass;

an uprising pipe made of refractory material, which connects to the vacuum degassing vessel in the vacuum housing, and sucks and draws up undegassed molten glass to introduce the undegassed molten glass into the vacuum degassing vessel;

a downfalling pipe made of refractory material, which connects to the vacuum degassing vessel in the vacuum housing and draws down the degassed molten glass from the vacuum degassing vessel to discharge the degassed molten glass;

an upstream pit located under a lower edge of the uprising pipe and which supports the vacuum housing and the uprising pipe and connects to the uprising pipe;

a brick receiver external to the upstream pit and between the uprising pipe and the upstream pit; and a downstream pit located under a lower edge of the downfalling pipe and which supports the vacuum housing and the downfalling pipe and connects to the downfalling pipe;

wherein the lower edge of the uprising pipe and the lower edge of the downfalling pipe are positioned at a lower level than a liquid level of the undegassed molten glass when depressurization starts.

2. The apparatus according to claim 1, wherein the brick receiver comprises a plurality of refractory bricks combined so as to have polished surfaces located in surface contact with each other, the polished surfaces having a smoothness of not greater than 0.3 mm, and seal glass is filled into a joint between adjoining refractory bricks.

3. The apparatus according to claim 1, wherein the brick receiver has a metallic retainer provided therearound.

4. The apparatus according to claim 1, wherein the vacuum housing has a lower end portion extended downwardly along the uprising pipe, the lower end portion has a lower end located at the same level as the lower end of the uprising pipe in a vertical direction, the brick receiver is interposed between the lower end portion and the uprising pipe, and the upstream pit, and the brick receiver has sealing material filled in a portion thereof in contact with the lower end portion.

5. The apparatus according to claim 4, wherein the lower end portion of the vacuum housing has a water pipe provided therearound.

6. The apparatus according to claim 1, wherein at least one of the uprising pipe and the downfalling pipe has a lower end portion extended from the vacuum housing, and at least one portion around an outer periphery of the lower end portion of the at least one of the uprising pipe and the downfalling pipe is covered by sealing material.

7. The apparatus according to claim 6, wherein a water pipe is provided to contact with the sealing material which covers the downfalling pipe.

8. The apparatus according to claim 7, wherein the at least one of the uprising pipe and the downfalling pipe is clamped by a band-shaped metallic fixture on an outer surface of the sealing material.

9. The apparatus according to claim 8, wherein the water pipe is provided between the sealing material and the band-shaped metallic fixture.

10. The apparatus according to claim 6, wherein at least one of a contacting portion of the lower end portion of the uprising pipe and a brick receiver interposed between the uprising pipe and the upstream pit, and a contacting portion of the lower end portion of the downfalling pipe and a brick receiver interposed between the downfalling pipe and the downstream pit has sealing material filled therein.

11. A vacuum degassing apparatus for molten glass, comprising:

a vacuum housing which is evacuated to be depressurized therein;

a vacuum degassing vessel made of refractory material, which is provided in the vacuum housing to vacuum-degas molten glass;

an uprising pipe made of refractory material, which connects to the vacuum degassing vessel in the vacuum housing, and sucks and draws up undegassed molten glass to introduce the undegassed molten glass into the vacuum degassing vessel;

a downfalling pipe made of refractory material, which connects to the vacuum degassing vessel in the vacuum housing and draws down the degassed molten glass from the vacuum degassing vessel to discharge the degassed molten glass;

an upstream pit located under a lower edge of the uprising pipe and which supports the vacuum housing and the uprising pipe and connects to the uprising pipe;

a downstream pit located under a lower edge of the downfalling pipe and which supports the vacuum housing and the downfalling pipe and connects to the downfalling pipe; and a brick receiver external to the downstream pit and between the downfalling pipe and the downstream pit;

wherein the lower edge of the uprising pipe and the lower edge of the downfalling pipe are positioned at a lower level than a liquid level of the undegassed molten glass when depressurization starts.

12. The apparatus according to claim 11, wherein the brick receiver comprises a plurality of refractory bricks combined so as to have polished surfaces located in surface contact with each other, the polished surfaces having a smoothness of not greater than 0.3 mm, and seal glass is filled into a joint between the refractory bricks.

13. The apparatus according to claim 11, wherein the vacuum housing has a lower end portion extended downwardly along the downfalling pipe, the lower end portion has a lower end provided at the same level as the lower end of the downfalling pipe in a vertical direction, the brick receiver is interposed between the lower end portion and the downfalling pipe, and the downstream pit, and the brick receiver has sealing material filled in a portion thereof in contact with the lower end portion.

* * * * *